United States Patent [19]

Huber et al.

[11] 3,833,798

[45] Sept. 3, 1974

[54] DATA PROCESSING SYSTEMS HAVING MULTIPLEXED SYSTEM UNITS

[75] Inventors: Josef Huber, Munich; Bernhard Schaffer, Munich, both of Germany

[73] Assignee: Siemens Aktiengesellschaft, Munich, Germany

[22] Filed: Oct. 20, 1972

[21] Appl. No.: 299,283

[30] Foreign Application Priority Data

Oct. 28, 1971 Germany ............................ 2153830

[52] U.S. Cl. ............................................ 235/153 AE
[51] Int. Cl. ............................................ G06f 11/00
[58] Field of Search ........... 235/153 AE; 340/172.5, 340/146.1 BE

[56] References Cited

UNITED STATES PATENTS

| | | | |
|---|---|---|---|
| 3,302,182 | 1/1967 | Lynch et al. | 340/172.5 |
| 3,609,704 | 9/1971 | Schurter | 340/172.5 |
| 3,624,372 | 11/1971 | Philip et al. | 235/153 AE |
| 3,665,173 | 5/1972 | Bouricius et al. | 235/153 AE |

*Primary Examiner*—Charles E. Atkinson

[57] ABSTRACT

A circuit arrangement is described for the connecting of system units constituting a program controlled data processing system. These system units are data processors and storage units. The individual system units are redundantly connected in multiplex fashion in order to insure system reliability. That is, a given defective system unit will be replaced by a like redundantly provided system unit, while the defective unit is placed in a testing state and isolated from the rest of the system. The redundance of the various processors may be provided for by providing them either in duplicate or in triplicate. Each said processor contains two standard data terminals. The individual processors are cyclically connected to storage units provided in triplicate, and these storage units which are equipped with a plurality of parallel, standard data terminals. Thus, at any given time, two like processing units are connected to one of the storage units.

2 Claims, 2 Drawing Figures

DATA PROCESSING SYSTEMS HAVING MULTIPLEXED SYSTEM UNITS

BACKGROUND OF THE INVENTION

This invention relates to a circuit arrangement for connecting system units of a program controlled data processing system comprising processing units and a central storage unit, wherein the individual system units are multiplexed to increase the reliability of overall system operation. A particular application of the foregoing arrangement is one in which defective system units can be placed in a testing state so as to isolate them from the rest of the system, which remains intact.

In known program controlled data processing systems used with particular advantage as program controlled telecommunication switching systems, series of system units are utilized as data processing units in which program controlled data processing operations can be performed. The programs and data required therefor are held in a central storage unit which, in turn, may be looked upon, as well, as a system unit. The processing units are constantly in communication with one another through the central storage unit.

The foregoing communications between processors and storage occur in a manner such that a processing unit in which a program is to be executed requests of the storage unit storage cycles in accordance with the jobs to be performed by the processor. An exchange of information with the central storage then occurs constantly within an allotted cycle. Both the request and the allocation of storage cycles takes place through a central control in the storage, from which the cycle requests, e.g., according to the priorities of the jobs to be performed, are assigned to the requesting processing units. A detailed description of the cycle allocation and of the central control in the storage are found, for example, in German Unexamined Pat. application No. 1,944,483.

A commonly used technique for increasing the safety in operation and the dependability of such a processing system is to provide each of the individual system units in duplicate. Due to the interchangeability of individual system units in this type of modular construction if a system unit breaks down, its tasks can be taken over by each of the other system units. The duplexing of the system units extends to those available as storage units. Each of the processing units is thereby connected to each of the two storage units through two standard connections. It is also possible to place the malfunctioning system units in a testing state and to cause them to be diagnosed by the rest of the system that remains intact (e.g., see West German Pat. application Ser. No. 2012052).

The dependability of the processing system may further be enhanced by providing the individual system units in triplicate rather than duplicate. In order to interconnect the individual system units in this triplexed system, three standard connections should be provided to the processing units, on the analogy of the duplexed system; through these connections, each processing unit can be individually connected to each of the three storage units. However, this would require the provision of three standard connections to each processing unit, and this would entail the considerable inconvenience that in order to transform a duplexed system in a triplexed system, each processing unit would have to be provided with an additional third standard connection, or existing processing units would have to be replaced by new ones.

An object of this invention is, therefore, the provision of means for avoiding the above disadvantages and for offering the possibility of transforming in a simple way a processing system having duplexed system units into one having triplexed system units by using processing units with two standard connections each.

SUMMARY OF THE INVENTION

The aforementioned and other objects are achieved by this invention in that each of the triplexed or duplexed processing units, which are equipped with two standard connections, is connected cyclically to triplexed storage units. Each storage unit is provided with a plurality of duplexed parallel standard connections, so that, at the most, two processing units are connected to one of the three storage units.

In a preferred embodiment of the invention, in order to achieve the aforementioned arrangement comparators are connected between the two standard connections of the processing units and, as well, between the two standard connections of the storage units. These comparators monitor the data flowing through the two standard connections with a view to discovering whether they are identical.

BRIEF DESCRIPTION OF THE DRAWINGS

The principles of the invention will be more readily understood by reference to the description, given below, of a preferred embodiment constructed according to those principles, and to the drawings which are briefly described as follows.

DETAILED DESCRIPTION OF THE DRAWINGS

Figure 1:
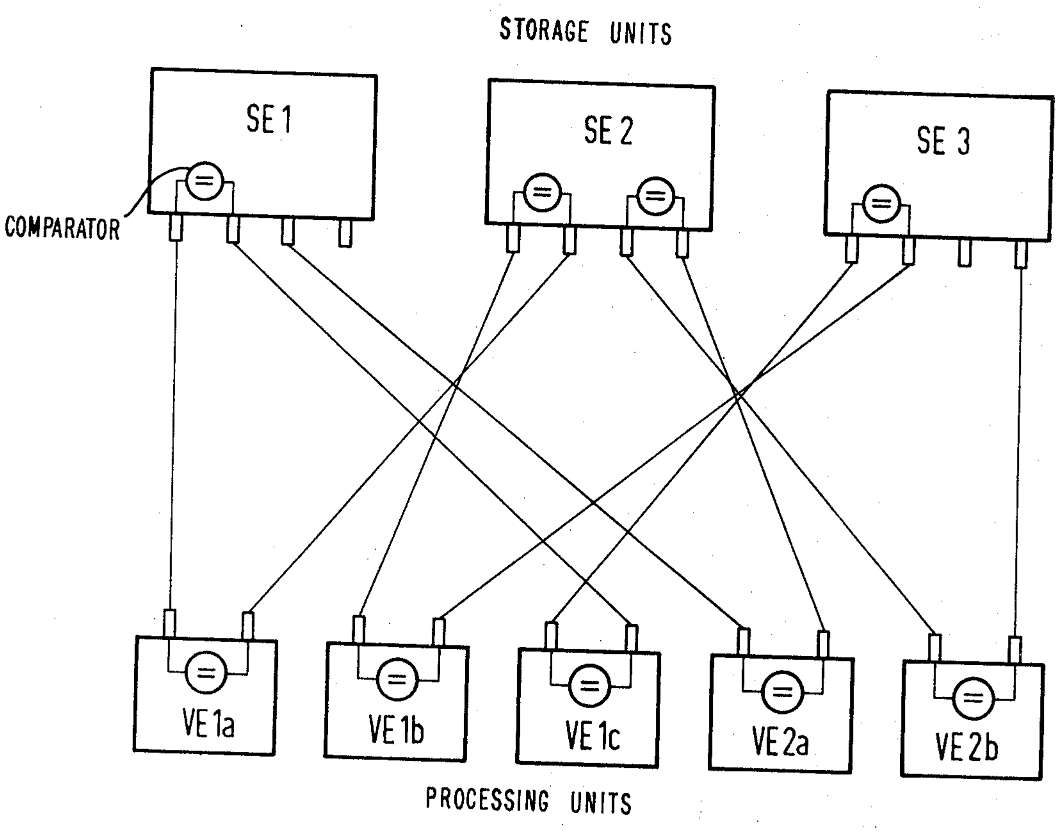
FIG. 1 is a block-schematic diagram illustrating the arrangement of system units in a complete data processing system.

Referring to FIG. 1, it is to be noted that the data processors and storages discussed hereinbelow individually form no part of this invention, and it is contemplated that conventional data processing apparatus may be used. An example of suitable system units can be found in U.S. Pat. No. 3,551,892. Further, for a clearer explanation, only one triplexed and one duplexed processing unit are shown. According to the needs in each particular case, there is the possibility of providing additional triplexed or duplexed processing units which are connected to the storage units in the same manner as the processing units illustrated in FIG. 1, as will be described hereinbelow.

In a program controlled data processing system, all data and programs necessary for the operation of the system are retained in a central storage. Since, as a result, the individual processing units can only operate through the central storage, in the case of multiplexed system units the storage units are available in the highest number of corresponding units provided, i.e., three in the case under discussion. The processing units may be provided in triplicate or duplicate, as required. The connection between the processing units and the storage units is realized through the standard connections at the storage units and at the processing units. Since each of the individual processing units in a conventional duplex system structure has two standard connections for a communication with each of the two storage units, there arises the problem, if the system units are subsequently triplexed, of inserting the processing units into the triplexed system without loss of redundance.

To achieve the foregoing, the processing units, be they provided in triplicate (VE1*a* to VE1*c*) or duplicate (VE2*a*, VE2*b*), are cyclically connected to the three identical storage units (SE1, SE2 and SE3). Thus, at any given time, one of the three storage units is connected with, at the most, two identical processing units. By way of example, if the triplexed processing unit VE1 is connected through its first part VE1*a* to the first and second storage units (SE1 and SE2), the triplexed processing unit VE1 is connected with its second part VE1*b* to the second and third storage units (SE2 and SE3), etc. It is to be noted that the triplexed storage units SE, as in the duplexed system units, have a plurality of duplexed parallel standard connections each, and that the data flowing therethrough are compared for identity through comparators (described hereinbelow). The parallel identical processing units are connected, not randomly to any standard connections of the storage units, but only to the aforementioned parallel standard connections of the storage units. This requirement must be fully met at all times in triplexed processing units. However, in duplexed processing units a parallel standard connection is fully seized only at a storage unit; namely, only at the second unit SE2, as shown in the drawing, while at the other two storage units only half of a parallel standard connection is seized at any given moment. Consequently, the data flow from the duplexed processing units VE2*a*, VE2*b* to the storage units can only be compared in a storage unit to which both are connected; namely, as shown in the drawing, at the second storage unit SE2. Also, in order to be able to also monitor the flow of data from the storage units to the processing units, comparators are, likewise, provided between the two parallel standard connections of the processing units.

This comparison of the flows of data and signals through the parallel standard connections at the storage and processing units is important for the detection and localization of malfunctioning system units. Basically, the cases may be distinguished by the occurrence of an error in a triplexed or duplexed processing unit or in a storage unit. A system unit is deemed faulty, whenever a response by the comparator, i.e., an error, is signalled to the faulty system unit by two other identical system units.

By way of example, if an error occurs in the processing unit VE1*a*, so that the processing unit VE1*a* transmits signals to the two storage units SE1 and SE2 which do not correspond to the signals of the parallel-running processing units VE1*b* and VE1*c*, the comparators in the two storage units SE1 and SE2 allocated thereto respond and deliver a fault message. The comparator in the third storage unit SE3 will not react. The fault message produced by the comparators in the first and second storage unit SE1 and SE2 is signalled to the connected processing unit VE1*a*, VE1*b*, and VE1*c*, so that the processing unit VE1*a*, which receives a fault message from two storage units, can be switched off as faulty, while the two other processing units VE1*b* and VE1*c* remain in working order. If a dually operated processing unit, e.g., VE2*a*, functions incorrectly, only the corresponding comparator in the storage unit SE2 is actuated, and the two processing units VE2*a* and VE2*b* receive a fault message from the storage unit SE2. As a result, localization of a malfunctioning dually operated processing unit is not possible. Therefore, system units which are provided only in duplicate must, in case of error, be switched off together every time.

A malfunctioning storage unit is localized in the same way by the comparators and corresponding fault messages of the processing units as a defective triplexed processing unit, if a storage cycle has precisely been requested by a triplexed processing unit.

If, upon the occurrence of an error in a storage unit, a storage cycle requested by a duplexed processing unit VE2 is operated upon, the malfunctioning storage unit can be detected as such in the aforesaid manner. This is true, however, only if the malfunctioning storage unit is the storage unit that has a connection with each of the two processing units VE2*a* and VE2*b*. If one of the two other storage units, e.g., SE1, sends faulty data or signals to the duplexed processing unit VE2*a*, each of the storage units SE1 and SE2 will receive an error message from the processing unit VE2*a* only. Therefore, in this case, the malfunctioning storage unit SE1 cannot be detected in the manner described above. Nevertheless, in order to be able to localize a defective storage unit, e.g., the first storage unit SE1, also when operating on a cycle request from a duplexed processing unit, the invention affords the possibility of causing the second storage unit SE2 to retransmit the result of the comparison of the second processing unit VE2*b* (no error) to the first processing unit VE2*a*. This permits the malfunctioning storage unit SE1 to be discovered and switched off by the processing unit VE2*a*.

In order to keep intact and in working order the rest of the system, special steps must be taken in accordance with the principles of the invention, upon the occurrence of a fault in a system unit.

If one of three parallel running processing units, e.g., processing unit VE1*a*, fails, there is the danger that false data can be introduced into the storage units SE1 and SE2 connected to the processing unit VE1*a*, if the corresponding comparators in these storage units SE1 and SE2 do not react with sufficient speed. In this case, only the third storage unit SE3 holds data which are assuredly free of errors. Thereupon, the first two storage units SE1 and SE2 and, as a result, each processing unit have a connection with only the first two storage units SE1 and SE2, i.e., the defective processing unit VE1*a*, are placed in the testing state and, thus, isolated from the rest of the system that remains intact. Subsequently, the defective processing unit VE1*a* can be diagnosed with the aid of the part of the system which is in the testing state, while the rest of the system that is intact remains in working order. This diagnosis process forms no part of this invention and is not described further herein.

If one of the duplexed processing units, e.g., the processing unit VE2*a*, is faulty, this malfunctioning unit VE2*a* cannot be localized, as pointed out hereinabove. As a result of the fault message of the comparator allocated to the two processing units VE2*a* and VE2*b* in the second storage unit SE2, the two processing units VE2*a* and VE2*b* are placed in the testing state. As it is now not possible to discover the storage unit which contains error-free information, means are provided to enable the comparator in the second storage unit SE2 to react rapidly so as to block the flow of information from the defective processing unit VE2*a*. This rapid action permits the information content of the second storage unit SE2 to remain free of errors. On this premise, the two other storage units SE1 and SE3 are placed in the testing state, and the two processing units VE2*a* and VE2*b* are diagnosed by the part of the system that is in the testing state. The rest of the system will remain intact and continue its operation with the second storage unit SE2.

If there is a malfunction in a storage unit, it must again be considered, with respect to the further operation of the processing system, whether, upon the detection of a failure, a cycle request is operated upon by a triplexed or a duplexed processing unit. In the first instance, the two processing units which receive defective information from a storage unit and which subsequently place the faulty storage unit in the testing state, are placed in the testing state. If desired, further system units may be placed in the testing state to locate and explain detectable errors.

In the second instance, there are again two possibilities. First, the two processing units VE2*a* and VE2*b* receive faulty information from a storage unit SE2. Consequently, the two processing units VE2*a* and VE2*b*, as well as the storage unit SE2, are placed in the testing condition. Second, only one processing unit, e.g., processing unit VE2*a*, receives erroneous information. In this case, the malfunctioning storage unit SE1 is switched off in the manner described hereinabove and placed in the testing state together with the processing unit VE2*a*.

It is useful to put the processing system into operation by degrees. One possibility for achieving this purpose will be explained hereinbelow. Identical data and programs are written into the two storage units SE1 and SE2 through a processing unit, e.g., processing unit VE1*a*. Subsequently, two of three program control units (not shown but of known construction) receive a coordinating program for the triplexed storage operation. Attention should be paid to the fact that each of the two program control units has a connection to the third storage unit SE3, which has not yet been connected. This storage unit SE3 is then placed in a reclosing state. In this condition, information is read solely from the first two storage units SE1 and SE2 which are in operation, while this information is being written into all three storage units. Thus, all three storage units are loaded with identical information.

Upon completion of the latter process, the third storage unit SE3 is placed in operating condition. Thereafter, the third program control unit is put into operation by placing a program request in the storage unit through the other two program control units. With the acceptance of this program request, all three program control units start an identical program. Other processing units may be added in triplicate or duplicate to the processing system. In similar fashion, system units may again be switched into operation after a malfunction.

Figure 2:
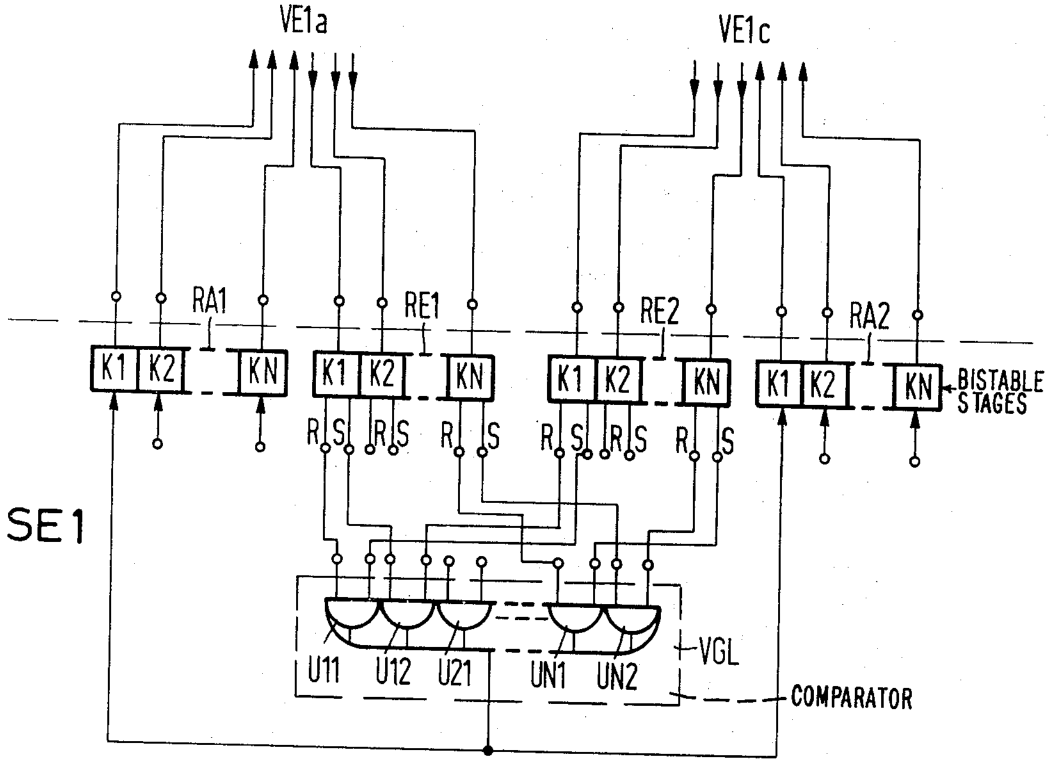
FIG. 2 is a detailed schematic diagram of the comparators and standard terminals connected in each of the system units in the FIG. 1 embodiment.

For a detailed description of the mode of operation of a comparator, reference is made to FIG. 2, wherein the comparator is connected with two parallel standard terminals. The construction of all standard terminals and all comparators connected to the parallel standard terminals is fundamentally the same. Therefore, in the drawing only one comparator, as well as its connection to the parallel standard terminals in the storage unit SE1, is shown. Each standard terminal comprises an input register RE and an output register RA. These registers are of conventional construction and are constituted by a plurality of bistable stages. The information signals are written into the system unit concerned through the input register RE. Conversely, they are read out through the output register RA.

A comparator is disposed in each system unit. Thus, in FIG. 2, the storage unit SE1 is provided with a comparator VGL, which is connected to two parallel standard terminals. These two parallel standard terminals are associated with the input registers RE1 and RE2, as well as with the output registers RA1 and RA2. The inputs of register RE1 and the outputs of register RA1 are each connected with a similar standard terminal of the processing unit VE1*a*, and the inputs of register RE2, as well as the outputs of register RA2, are similarly connected with the corresponding standard terminal of the processing unit VE1*c*. Each of the input and output registers of the standard terminals comprises bistable N stages K1 to KN. The outputs of the bistable stages of input registers RE1 and RE2 are each represented by the setting and resetting outputs S and R.

The comparator VGL connected to the outputs of the parallel input registers RE1 and RE2 comprises $2 \times N$ AND gates U11 to UN2, which have two inputs each and whose outputs are connected to a common output through an OR-gate or the like.

In the comparator VGL, the output signals from the parallel bistable stages of input registers RE1 and RE2 are each monitored separately with a view to supervising the identity of the parallel information. Thus, the outputs of bistable stages K1 of the input registers are checked by the two AND gates U11 and U12. To this end, the resetting output R of bistable stage K1 of input register RE1 is connected with the left input of AND gate U11, and the right input of this AND gate is connected with the setting output S of the bistable stage K1 of input register RE2. The setting output S of bistable stage K1 of input register RE1 is similarly connected with the left input of AND gate U12, whose second input is connected to the resetting output R of bistable stage K1 of input register RE2.

Since in a faultless operation, identical data are written into the storage unit SE1 through the input registers RE1 and RE2, in this case no output signal is transmitted to the output of comparator VGL. If, however, different signals appear at the outputs of the bistable stage K1 of input registers RE1 and RE2, a signal is produced either at the output of AND gate U11 or of AND gate U12 and, thus, at the output of comparator VGL. This output signal of comparator VGL is sent to the connected system units through one of the bistable stages of the output registers. For example, it is sent through the bistable stage K1 of output registers RA1 and RA2 in the processing units VE1*a* and VE1*c*, triggering an error reaction therein.

This invention has been described hereinabove in terms of a preferred embodiment, which is considered to be only exemplary. This described embodiment may be modified or changed within the scope of the invention, as defined by the appended claims.

We claim:

1. A circuit arrangement for connecting system units constituting a program controlled data processing system, said system units being data processing units and storage units, each of said processing units and storage units of a like kind being redundantly provided in such a manner that one of said units, when defective, will be replaced by a like unit, comprising:

a plurality of data processing units of different kinds, each kind of processing unit being redundantly provided in one of duplicate or triplicate, each said processing unit having at least two standard data terminals, storage units provided in triplicate and having a plurality of parallel standard data terminals and means connecting said processing and storage units such that each said redundantly provided processing unit is connected to two of said storage units, each identical processing unit being connected to a different combination of storage units.

2. The circuit arrangement defined in claim 1 wherein each said processing and storage unit includes at least two of said standard data terminals and further comprising:

a plurality of comparator means for comparing data signals for identity and for transmitting an error signal upon noting lack of identity, said comparators being connected in each said system unit between the two standard data terminals therein which are connected with two others of said system units of like kind.

* * * * *